(12) United States Patent
Villiger et al.

(10) Patent No.: US 9,791,684 B2
(45) Date of Patent: Oct. 17, 2017

(54) OPTICAL COHERENCE MICROSCOPY SYSTEM HAVING A FILTER FOR SUPPRESSING A SPECULAR LIGHT CONTRIBUTION

(75) Inventors: Martin Villiger, Ecublens (CH); Christophe Pache, Le Mont (CH); Theo Lasser, Denges (CH)

(73) Assignee: Ecole Polytechnique Fédérale de Lausanne (EPFL), Lausanne (CH)

( * ) Notice: Subject to any disclaimer, the term of this patent is extended or adjusted under 35 U.S.C. 154(b) by 397 days.

(21) Appl. No.: 13/521,001

(22) PCT Filed: Jan. 4, 2011

(86) PCT No.: PCT/IB2011/050020
§ 371 (c)(1),
(2), (4) Date: Sep. 17, 2012

(87) PCT Pub. No.: WO2011/083420
PCT Pub. Date: Jul. 14, 2011

(65) Prior Publication Data
US 2013/0010283 A1 Jan. 10, 2013

(30) Foreign Application Priority Data
Jan. 6, 2010 (CH) .............................................. 8/10

(51) Int. Cl.
G02B 21/12 (2006.01)
G01J 3/453 (2006.01)
G01B 9/02 (2006.01)

(52) U.S. Cl.
CPC ....... G02B 21/125 (2013.01); G01B 9/02002 (2013.01); G01B 9/02057 (2013.01);
(Continued)

(58) Field of Classification Search
CPC ............ G01B 9/02019; G01B 9/02027; G01B 9/02028
(Continued)

(56) References Cited

U.S. PATENT DOCUMENTS

2003/0218756 A1 11/2003 Chen et al.
2006/0109476 A1 5/2006 Werner et al.
(Continued)

FOREIGN PATENT DOCUMENTS

WO WO 03/012528 2/2003
WO WO 03/012528 A2 2/2003
(Continued)

OTHER PUBLICATIONS

International Search Report for PCT/IB2011/050020, mailed Jul. 26, 2011.
(Continued)

*Primary Examiner* — Hwa Lee
(74) *Attorney, Agent, or Firm* — Nixon & Vanderhye P.C.

(57) ABSTRACT

The invention relates to an optical coherence microscopy system for fast, phase resolved imaging by means of optical coherence microscopy with decoupled illumination and detection apertures, producing a dark-field effect with an enhanced optical contrast. The setup uses a light source with an appropriate temporal coherence, an interferometer and an array detector combined with a spectrometer. The dark-field effect is produced by optical filter means in the illumination and detection paths, positioned in conjugated planes of the sample microscope objective. These optical means comprise for example refractive or diffractive elements, amplitude or phase masks, or programmable spatial light modulators. The object is scanned via a scanning unit allowing a point scan of the object.

5 Claims, 11 Drawing Sheets

(52) U.S. Cl.
CPC ......... *G01B 9/02091* (2013.01); *G01J 3/453* (2013.01); *G01B 2290/50* (2013.01); *G01B 2290/70* (2013.01)

(58) Field of Classification Search
USPC .................................................. 356/479, 497
See application file for complete search history.

(56) References Cited

U.S. PATENT DOCUMENTS

| | | | | |
|---|---|---|---|---|
| 2009/0128824 | A1* | 5/2009 | Leitgeb et al. | ............... 356/446 |
| 2010/0002241 | A1 | 1/2010 | Hirose | |

FOREIGN PATENT DOCUMENTS

| | | |
|---|---|---|
| WO | WO 2004/043245 | 5/2004 |
| WO | WO 2006/100544 | 9/2006 |
| WO | WO 2007/085992 | 8/2007 |

OTHER PUBLICATIONS

Written Opinion of the International Searching Authority for PCT/IB2011/050020, mailed Jul. 26, 2011.

Tumlinson, A.R. et al., "Scatter sensitive microscopic techniques to identify contrasting mucosal structures in ultrahigh-resolution optical coherence tomograms of mouse colon", Pedinfs of the SPIE, vol. 6851, (Feb. 7, 2008), pp. 68510A-1-68510A-12.

Pache, C. et al., "Dark-field optical coherence microscopy", Proceedings of the SPIE, vol. 7554, (Jan. 25, 2010), pp. 755425-1-755425-4.

A.R. Tumlinson et al.: "Scatter sensitive microscopic techniques to identify contrasting mucosal structures in ultrahigh-resolution optical coherence tomograms of mouse colon", Pedinfs of the SPIE, vol. 6851, Feb. 7, 2008 (Feb. 7, 2008), pp. 6851 OA-1-6851 OA-12.

C. Pache et al.: "Dark-field optical coherence microscopy", Proceedings of the SPIE, Re Item III vol. 7554, Jan. 25, 2010 (Jan. 25, 2010)-Jan. 28, 2010 (Jan. 28, 2010), pp. 755425-1 755425-4.

* cited by examiner

OPTICAL COHERENCE MICROSCOPY SYSTEM HAVING A FILTER FOR SUPPRESSING A SPECULAR LIGHT CONTRIBUTION

This application is the U.S. national phase of International Application No. PCT/IB2011/050020, filed 4 Jan. 2011, which designated the U.S. and claims priority to CH Application No. 00008/10, filed 6 Jan. 2010, the entire contents of each of which are hereby incorporated by reference.

FIELD OF THE INVENTION

The present invention relates to the field of optical coherence microscopy, and in particular to an improved optical system suppressing direct sample reflection.

STATE OF THE ART

Optical coherence tomography (OCT) is an imaging modality based on the coherence properties of light. This interferometric imaging technique allows for high-resolution, cross-sectional imaging of biological samples. In the classical time domain implementation of OCT, a low-coherent light from a broadband light source is divided into the reference path and into the sample path. The interference pattern as a result of the superposition of back-reflected light from the sample as well as the reference path contains information about the scattering amplitude as well as the location of the scattering sites in the sample. In conventional time-domain optical coherence tomography (TD-OCT) the position of the reference mirror in the interferometer is rapidly scanned in order to extract the scattering amplitude from the interference signal and to build a depth profile of the sample.

This TD-OCT has some important limitations. First, in TD-OCT, the image acquisition rate is mainly limited by the technical requirements for the depth scan. This translates often into an increase of complexity for the scanning system with a decreasing reliability especially for OCT-systems with high acquisition speeds close or at video rates. Second, the serial signal acquisition in TD-OCT during an A-scan is not very efficient. The sample is illuminated over the whole depth, whereas the signal results only from the backscattered field emanating from a limited volume limited by the 'coherence-gate'. Third, the serial scanning in TD-OCT demands that the sample under investigation remains stationary during the whole tomographic image acquisition time, otherwise motion artifacts may severely degrade the image quality.

A potential solution overcoming these limitations represents the so-called Fourier Domain Optical Coherence Tomography (FD-OCT). As its counterpart TD-OCT, FD-OCT belongs also to low coherence interferometry. However in FD-OCT, the reference arm has a pre-chosen but fixed arm-length during the image acquisition and the scattering amplitude over depth is derived from the optical spectrum of the detected light resulting from the back-reflected mainly specular reflections of the sample field mixed with the reference field. This light field is spectrally decomposed by a spectrometer and detected by an array detector such as a charge-coupled device (CCD), which allows the registration of the spectrally resolved information simultaneously. The registered spectrum encodes the complete depth profile. FD-OCT does not need a serial depth scanning and records the full depth information in parallel. This allows a high-speed acquisition of depth profiles well above 10 kHz. Moreover, FD-OCT shows increased sensitivity due to the so-called Fellgett advantage, in comparison to conventional TD-OCT. The optical signal already highly amplified in the TDOCT is further enhanced and allows extracting weakly scattering sample features with high signal to noise ratio.

An alternative optical imaging concept is spectral domain OCT (SD-OCT) where the light source is a so-called swept source, sweeping the illumination light very fast over a certain wavelength range. Instead of a spectrometer linear array detector a single element detector synchronized with the swept source is used. This SD-OCT configuration is an alternative optical coherence realization equivalent to FD-OCT and belonging to the whole family of possible imaging methods based on optical coherence tomography.

The Fourier transform of the recorded spectrum is a complex valued function. The absolute value yields information about refractive index gradients in the sample whereas the argument gives access to structural changes with sub-wavelength precision. Phase resolved axial structural changes with a precision of 4 nm have been reported. By taking the phase difference between at least two adjacent depth profiles, the flow profiles in small blood vessels could be extracted. The origin of the phase change itself can be manifold. Tracing slight spatial changes of the—in general complex—refractive index for example would enable phase contrast imaging. In contrast to classical TD-OCT, FD-OCT would offer the advantage of higher imaging speed as well as the intrinsically enhanced phase stability. Finally the phase information is easily accessible as the image generation includes a Fourier transformation with a straightforward access to the phase information.

The lateral resolution in FD-OCT (and in a similar way in TDOCT) is limited by the numerical aperture of the optical system quite analogous to classical microscopy. As these interferometric imaging techniques allow to acquire a 3-dimensional image the requirement to have almost uniform illumination intensity over the whole imaging depth results in a stringent limitation of the numerical aperture. As is obvious to those skilled in the art an increase in numerical aperture as necessary for an improved lateral resolution will even further limited the accessible depth of field. In the case of Gaussian optics as mostly used in TD-OCT or FD-OCT the lateral resolution increases linearly with an increased numerical aperture whereas the depth of field diminishes according to an inverse quadratic relation of the numerical aperture. Such a device requires three-dimensional scanning and is termed Optical Coherence Microscope (OCM).

With an extended focus concept known as xfOCM (see WO 2007/085992 A1), this limitation can be overcome. Using a so-called Bessel beam, the focal field is axially strongly extended and allows an important lateral field confinement as required for high resolution imaging. This Bessel beam is generated with the help of an axicon element, which may be either a dome-shaped optical element or realized via an analogue diffractive optical element. More possibilities exist if spatial programmable light modulators are considered for the realization of such an illumination beam.

As known from classical microscopy, a classical dark-field illumination the sample is illuminated with a hollow cone of light where the cone angles are so large that the undeviated illumination light, meaning no sample present, cannot enter the objective lens. As known by those skilled in the art, the specular or direct reflected light from a microscope slide or even perpendicular sample surfaces are strongly suppressed. In particular, as the illumination beam is not entering the image formation ray paths, the background of the image appears dark. Only light of the sample, i.e. light scattered by optical discontinuities or refractive index variations enter the detection aperture and appear with high contrast in the image. The resulting contrast enhancement can be extremely high, and the diffracted light forming the image can be detected as bright intensity signals even when the scattering light field originating from object(s) become(s) vanishingly small compared to the resolution limit given by the NA of the objective. For these dark-field microscopes, the illumination and detection apertures are said to be split or masked. As known by those skilled in the art, equivalent arguments are valid for the corresponding pupils. A disadvantage of such an optical microscopy configuration is the limitation to a qualitative contrast enhancement. Furthermore classical dark-field imaging of a 3-D sample as for example a cell results in a 2-dimensional image where no depth information is accessible.

Various optical interferometers used for optical coherence tomography have been built and proposed. The known optical schemes correspond to interferometers which are known as of Mach-Zehnder type or of Michelson type. More types of interferometer are known to those skilled in the art. However, all these optical systems and in particular imaging system have specific planes which correspond or to the field planes or to the aperture planes. Associated to these planes are the so-called conjugated planes which are in an object-image relation. A manipulation in the objective's aperture for contrast enhancement, filtering (as an example but not limited to) or illumination as the aforementioned dark field illumination can be realized directly in the objective's aperture or in equivalent conjugated plane(s). This offers a manifold of optical solutions. In particular in an interferometer with a separation of the optical beam paths in at least one reference arm and in at least one illumination arm these conjugated planes are particularly suited for placing optical means which acts only on the illumination field and not on the detection field or vice versa.

In classical OCT and in particular in FD-OCT a high sensitivity to sample structures perpendicular to the optical axis is achieved. These sample structures mainly corresponding to high index gradients are dominantly backscattered into the detection aperture. Weakly scattering sample structures are heavily suppressed in particular if these structures are not aligned perpendicular to the optical axis.

FD-OCT and FD-OCT signal evaluation gives also access to different optical sample properties such as absorption, dispersion, and polarization. In the case of polarization, a detection unit is needed that records separately the two orthogonal polarization states of the light at the exit of the interferometer. Such information provides insight into functional properties of tissues or cells, such as for example oxygenation, glucose content, concentration of metabolic agents or mineralization. These are examples of intrinsic tissue or cell parameters accessible by FD-OCT. In addition, extrinsic contrast agents as for example nanoparticles can bind or link to specific cell structures and act as so called nano-markers that allow detecting intrinsic cell structures. It is known from literature that these nanoparticles can be functionalized via well selected proteins, antibodies and/or any chemical biomarker which binds intentionally to a specific tissue or cell site.

If the sample is illuminated with a line instead of a scanning point, additional speed advantage is gained. The set of parallel detection points is analyzed by an imaging spectrograph, where the spectrum of each parallel channel is recorded individually on a two dimensional detector array. After inverse FFT of each spectrum a full tomogram is obtained with one detector recording.

Crossed polarization fields in the illumination aperture and respectively the detection aperture yields an additional suppression of the interference contribution. As known by those skilled in the art, polarization filtering, rotation and selection can be used to achieve contrast enhancement. It is known that these possibilities based on polarization can be combined with the aforementioned dark-field contrast enhancement concepts. A disadvantage of classical optical polarization microscopy is the "only" qualitative contrast enhancement without access to the locally resolved retardation and optic axis orientation.

Photothermal contrast enhancement relies on the scattering changes induced by a modulated probe beam. A modulated probe beam causes a time-dependent variation of the refractive index profile due the dissipated heat by a pointlike absorber for example a nanoparticle in its surroundings. This modulated heating beam causes a temporally modulated scattering signature of the backscattered illumination field. Besides intrinsic absorbers such as cytochrome C or erythrocytes, extrinsic nanoparticles feature a very prominent absorption in particular at their plasmon resonance. Generally, the heating beam can be tuned to a high absorption of the nanoparticle causing a further enhanced backscattering.

Single particle tracking is a known modality to monitor biomolecular interactions and the functioning of metabolism on a single molecule level. Known concepts for single molecule detection as Fluorescence Correlation Spectroscopy, but not limited hereto, require high confinement of the sampling volume as well as a high rejection of background radiation. However, all these methods are based mainly on the detection of fluorescent molecules and a correlation analysis, but are prone to photo-bleaching and subject to the limited lifetime of fluorescent markers.

In summary, the existing optical coherence microscopy, such as disclosed in WO 2007/085992 A1, is designed to detect specular reflections or low angle reflection contributions. This low angle contribution very often largely overrides the high angle reflection contribution, often caused by tiny scatterers with micro- and nanometer sizes. As a severe disadvantage of these coherent imaging methods tiny scatterers as for example cell structures, membranes or nanoparticles as potential markers disappear in the strong signal amplitude caused by specular light contribution.

There is therefore a need to improve the detection of the high angle reflection contribution.

GENERAL DESCRIPTION OF THE INVENTION

An objective of the invention is to solve at least the above mentioned problems and/or disadvantages and to provide at least the advantages described herewith in the following.

Another objective of the invention is to suppress to a high degree specular reflections and/or directly reflected light.

Another objective of the invention is to detect higher spatial frequencies with enhanced sensitivity and contrast.

Another objective of the invention is to enable the construction of OCM imaging systems for the detection of small scatterers, for example nanomarkers, which have a size well below the systems resolution limit.

Another objective of the invention is to image a 3-dimensional distribution of the index of refraction.

A further objective of the invention is to enhance specifically the contrast of nanoparticles (non-functionalized of functionalized) based on the photothermal effect.

A further objective of the invention is to measure and to image a 3-dimensional distribution of the dispersion.

The above cited objectives are achieved with the present invention which concerns an optical coherence microscopy system comprising:
a light source,
sample holding means,
an illumination arm,
a reference arm,
a detection arm,
an objective located on said illumination arm,
at least one axicon adapted to produce a ring shaped illumination light field in the aperture or any conjugated pupil plane of said objective,
at least one filter positioned on said detection arm, in a conjugated plane of said objective.

A further objective of the invention is the detection and tracking of nanoparticles (functionalized with biomolecules or non-functionalized) for the monitoring of biomolecular interactions or metabolic functions.

Preferred embodiments of the invention are defined in the dependent claims. Additional advantages, objects and features of the invention will be set forth in part in the description and claims which follow and in part will become evident to those having ordinary skill in the art upon examination of the following or may learned from practice of the invention. The objects and advantages of the invention may be realized and attained as particularly pointed out in the appended claims.

DEFINITIONS, TERMS AND ELEMENTS

"Source" is used to mean any source of electromagnetic radiation, preferably a coherent source with sufficient stability and a sufficiently short coherence length.

"Detector" is used herein to mean any device capable of measuring energy in an electromagnetic signal as a function of wavelength. A detector array means a plurality of detectors. In general the preferred detector arrays used in this disclosure have their optimal sensitivity in the wavelength range of the used source. The detectors can either be one-, multi-dimensional or line arrays, depending on the optical setup and the optical scan system. In the mostly used wavelength range of around 800 nm, CMOS detectors have currently the best performance with respect to sensitivity and read out speed. However, current detector technology does not provide CMOS detectors that operate beyond the 1000 nm region. New detector technologies as for example GeSi detectors allow an extension of the detection range beyond 1000 nm and are included in this disclosure.

"Reflector" is used herein to mean any device capable of reflecting an electromagnetic signal. Thus, "reflector" can be used to mean a mirror, an abrupt change in an index of refraction, an auto-reflecting prism as well as a periodically spaced array structure such as a Bragg reflector. Applicants note that the terms "signal", "beam" and "light" are used in a synonymously manner, for including all forms of electromagnetic radiation suitable for use in imaging systems. It is also understood, that for the purposes of this disclosure, the term "optical" is to pertain to all wavelength ranges of electromagnetic radiation, and preferably pertains to the range of 100 nanometers to 30 micrometers.

"Filter" is used herein to mean any device capable of shaping the spatial frequency spectrum. A filter according to this definition may be an amplitude mask in the fourier plane of a lens or a lens combination, preferentially in the aperture or a pupil plane, blocking by obstruction all spatial frequencies up to a so-called cut-off frequency and allowing a free space propagation for light field contributions beyond that said cut-off frequency. This filter can be easily realized by a circular slit opening (band-pass filter), or circular open (low-pass filter) on a transparent glass slide coated with an opaque layer. It is well known to those skilled in the art that these filter elements can be realized by so-called spatial light modulators based on liquid crystal screen, or so-called DMD devices but not limited hereto. These amplitude filter are complemented by so-called phase filters acting the phase of the crossing light field without affecting the amplitude of said light field. Wavelength dependant filters may also be used. They comprise amplitude or phase or a combination of amplitude and phase filters acting only over a selected spectral range of the light source used in the imaging device. In the present application the terms "filter", and "masks" are used in a synonymously manner, for including all forms of action on the spatial frequency content in said filter plane suitable for use in imaging systems.

"Phase modulator" means any semiconductor or bulk device used to modulate or alter the phase of a electromagnetic field. The term "phase modulator" comprises also any liquid crystal device or any spatial light modulator which allows in addition a local lateral phase change. This phase modulation can be timely and spatially modulated on purpose and be linked via an interface to a programming device or an appropriate computer.

"Axicon" is an optical mean based on a dome shaped glass element or a concentric diffractive element. However this axicon is understood as an optical element to generate a Bessel beam (or a ring illumination in a corresponding Fourier plane). This axicon is also understood to generate any dome shaped illumination cone, whatever optical realization will be used as for example optical elements based on liquid crystals, or spatial light modulators or gradient optical elements. As a further consideration and generalization any optical mean allowing the separation of the illumination beam path from the detection beam path using separated parts of the sample objective aperture for illumination in a first sub-aperture of the objective and a different not overlapping second sub-aperture for detection of said objective. The simplest realization of a Bessel beam is a ring illumination in a well defined aperture or pupil plane. However this realization has the disadvantage of a low efficiency of the illumination intensity. Any new optical axicon element will not limit the scope of this invention but barely improve a detail element.

"Scanning optics" means any system configured to sweep an electromagnetic signal across a chosen area. Often this configuration includes optionally appropriate focusing means, appropriately positioned for performing an object-scan with either diffraction limited focusing spot, a Bessel beam or a plurality of spots, or with a continuous line.

"Specular reflection" means the mirror-like reflection of light from a flat surface, in which light from a single incoming propagation direction is almost reflected into a single outgoing propagation direction or at least in a narrow angle propagation direction, i.e. the kind of reflection, which is commonly described by the law of reflection "incident angle equals reflected angle". We refer to this kind of "specular reflection" when we mean to image in the so-called specular reflection mode (SR-mode) This is in contrast with "diffuse reflection", where the incoming light is reflected in a broad angular range of propagation directions.

If in this broad angular range of propagation directions the specular reflection contribution are masked, filtered or eliminated, then we mean to image in the so-called dark-field mode (DF-mode) It is well understood that even perfect "specular reflection" neither excludes partial refraction, nor absorption of the incident light.

Nanoparticles" means nanosized particles consisting of dielectric, semiconducting or metallic material. They can mediate an enhanced scattering due to their strong refractive index contrast with respect to the surrounding medium. A non-spherical shape of these nanoparticles may cause a polarization-dependant backscattering. Metallic particles further have an enhanced absorption at or close to their plasmonresonance, inducing characteristic and marked absorption profiles. This can be used in combination with a modulated heating beam, tuned to this resonance. The modulated heating beam is absorbed by the particle and converted into heat which induces a variation of the index of refraction in the vicinity of the absorbing particle. The consequence is a time modulated scattering signal of the probe field, distinct in wavelength from the heating beam, and off the plasmonresonance of the particle. A special subgroup of these nanoparticles are so-called functionalized nanoparticles, which are chemically prepared at their surface for the recognition of specific proteins, biostructures or biomolecules. These functionalized nanoparticles act as biomarker with a biospecific recognition in close analogy to the well known fluorescent markers used in fluorescence microscopy. However the recognition of these functionalized nanoparticles is in principle based on their scattering or absorption characteristics and not on their fluorescence response known from fluorescence microscopy.

DETAILED DESCRIPTION OF THE INVENTION

Figure 1A:
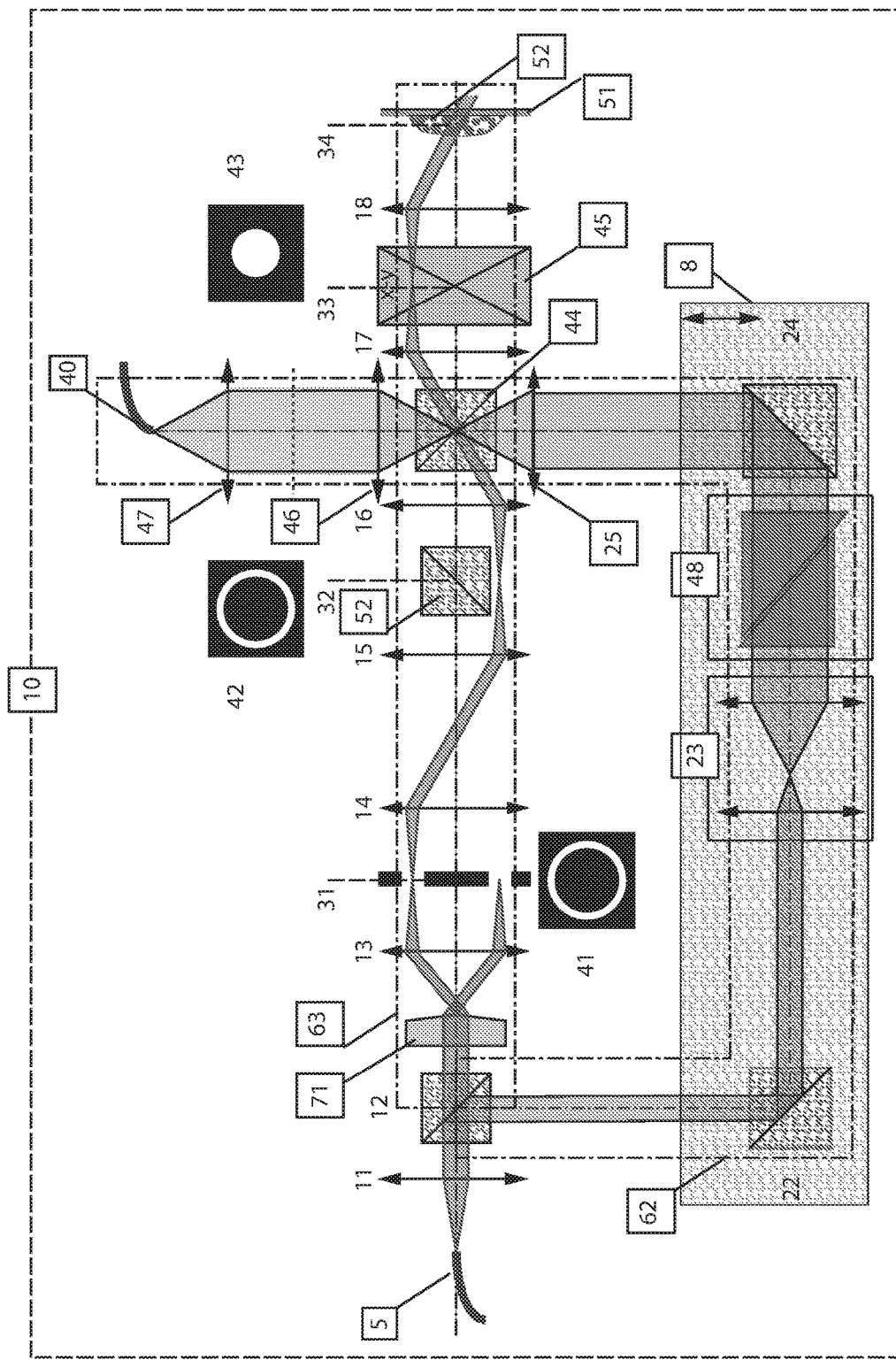
FIG. 1A is a schematic illustration of a first embodiment of a OCM system, showing the reference beam as well as the illumination beam in accordance with the present invention.

Referring to FIG. 1A, a first Optical Coherence Microscope (OCM) 10 in accordance with one embodiment of the present invention is shown. The OCM 10 of FIG. 1A includes a first optical mean 12 to split the collimated light field coming from the source port 5 and being collimated by lens 11 into the reference arm 62 forming the reference light beam and into the illumination arm 63 forming the illumination light beam. The reference arm contains prisms or mirrors 22, 24 for redirecting the reference light towards the detection port 40. An optional telescope 23 allows readjusting the beam width of the reference light beam. The lens elements 14, 15, 16, 17 and the objective 18 are selected, aligned and positioned in such a way to allow the imaging of the back aperture 33 of the objective 18 into the respective conjugated planes 31, 32, so-called pupil planes. By crossing the axicon element 71, the illumination beam is reshaped in a dome shaped light field which is focused by the lens 13 into the conjugated pupil plane 31 of the objective 18. Lens elements 14, 15, 16 and 17 transfer the lightfield from plane 31 into a ring shaped illumination field in the back aperture 33 of the objective 18. The plane 31 may contain a first filter element 41 for ensuring a homogeneous and stray light free ring shaped illumination beam. The illumination field crosses the objective 18 for illuminating the sample 52 positioned onto a transparent sample holder 51 typically realized by a microscope slide. The scanning system 45 is positioned in the conjugated plane 33 and ensures the lateral displacement of the illumination field inside the sample 52. All optical elements 22, 23, 24, 48 on the translation platform 8 allow to readjust the arm lengths of the illumination arm 63 and the reference arm 62 in such a way that the "equal arm length condition" is fulfilled. It is well understood that such an arrangement is also used in the further disclosed embodiments. However for illustration and clarity this element is not mentioned in the further embodiments.

Figure 1B:
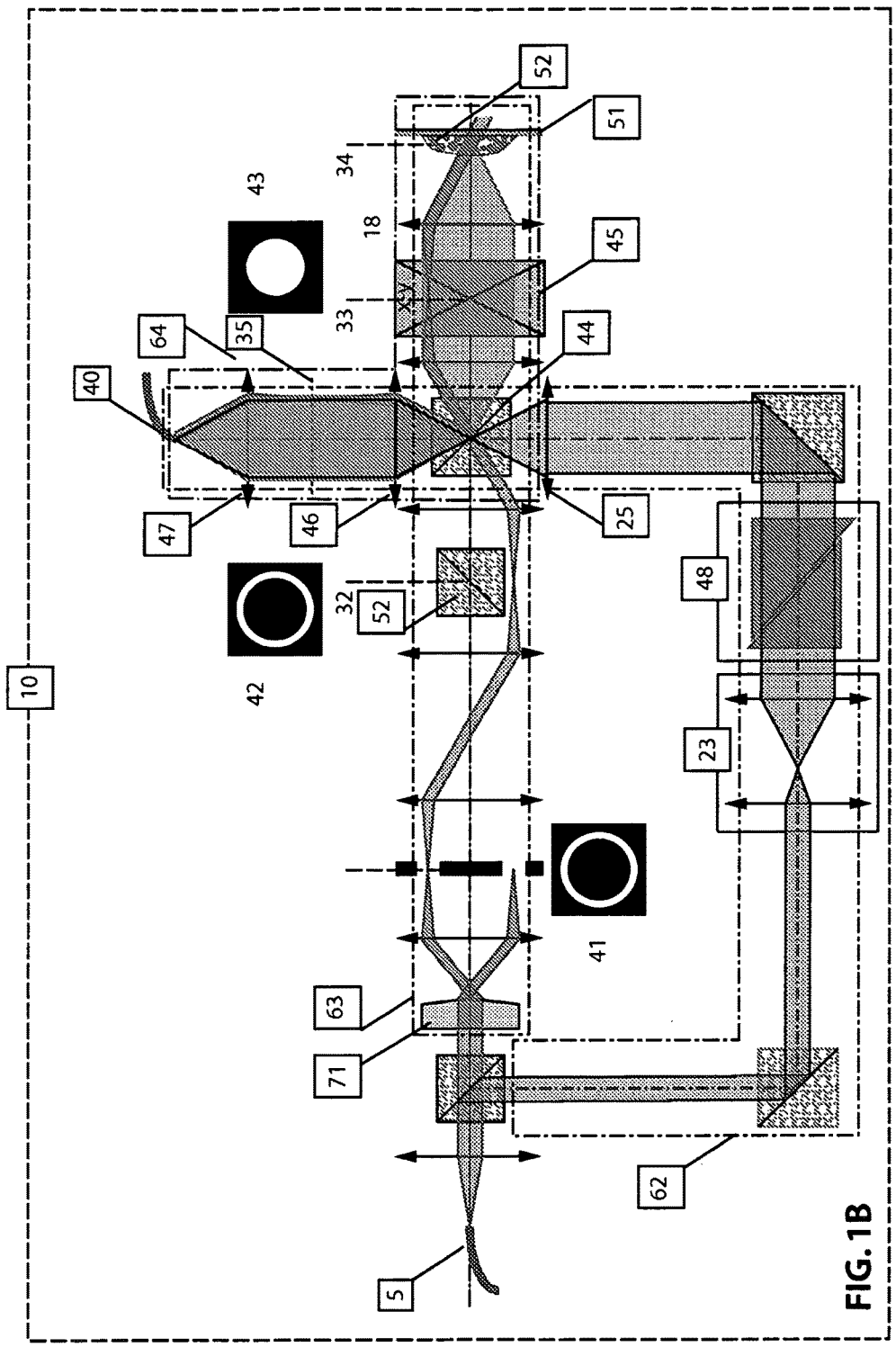
FIG. 1B is a schematic illustration of the first embodiment of a OCM system, showing in addition the detection beam in accordance with the present invention.

Referring to FIG. 1B, the identical OCM 10 shows in addition to FIG. 1A the detection arm 64 forming the detection light beam. The detection light beam starts at the sample 51, 52 crosses the objective 18, the scanning system 45 and is redirected by the prism 44 across the lens elements 46, 47 onto the detection port 40. As indicated in FIG. 1B the reference beam and the detection beam are largely overlapping. The plane 35 is conjugated to the back aperture plane 33 of the objective 18. This plane 35 is the location for the filter element 42 or alternatively filter element 43. For those skilled in the art these filter elements 42, 43 can also be realized by a programmable liquid crystal display or any other programmable spatial light modulator (SLM) or any motorized filter set, which will in no case present a further innovative step to any of the disclosed embodiments. Any of these solutions, fixed or programmable allow steering the overlap of the detection and illumination pupils in plane 35.

As indicated in FIG. 1B the filter elements 42 and 43 are mutually exclusive. The filter element 43 selects the inner part of the reference field and the backscattered field from the sample 51, 52. For this filter element any back reflection from the illumination field is suppressed. This corresponds to the dark field mode operation i.e. DF-mode operation, where the interference or the coherent interaction between the high spatial frequency contribution of the backscattered light field and the reference field represent the signal.

As also indicated in FIG. 1B the filter element 42 selects the outer part of the reference field and suppresses the inner part. For this filter element choice the low spatial frequency contribution from the back reflection from the sample 51, 52 and the illumination field are superimposed and interfere. This corresponds to the specular reflection mode operation, i.e. SR-mode operation, where the interference or the coherent interaction between the reference field and the back reflected illumination field form the signal for the disclosed OCM. For those skilled in the art, it is obvious that a switching between both modes allows to image sample details with different features due to the change in sensitivity and selection of the sample's frequency spectrum.

It is obvious for those skilled in the art that the filter element 41 suppresses all possible source aberrations as well as optical imperfections mainly caused by lens elements 11 and 13, the splitting prism 12 and the axicon element 71.

For those skilled in the art the aforementioned interplay of filter element said use of filter element 43 contributes to a strong specular suppression of directly reflected light contribution, an object of this invention.

Figure 2A:
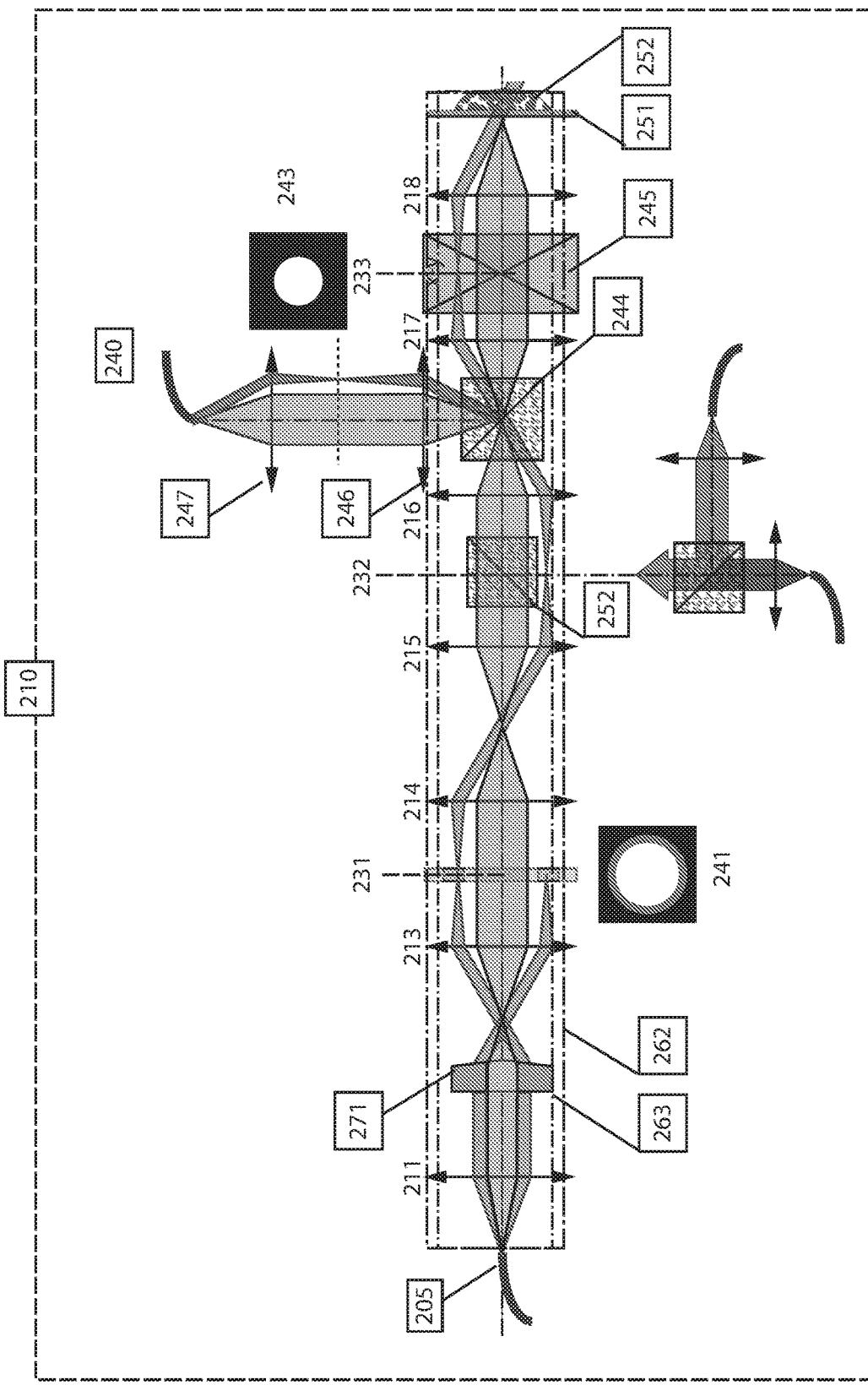
FIG. 2A is a schematic illustration of a forth embodiment of a common path OCM system, showing the reference beam as well as the illumination beam in accordance with the present invention.

Referring to FIG. 2A a further OCM 210 is disclosed. This OCM 210 represents a common path interferometric imaging system with enhanced phase stability. In this OCM system 210 the reference arm 262 and the illumination arm 263 are basically formed by the same lens element 211, 213, 214, 215, 216, 217 and the objective 218. In addition the prim element 244 is crossed by both arms 262, 263. The only but important exception is the generalized axicon element 271. The reference arm 262 forms the reference light. This reference light field experiences in the center of the generalized axicon element 271 a focusing. The illumination arm 263 forms the illumination light. The illumination light field crosses the axicon element 271 and is reshaped in a dome shaped light field. The illumination field is focused into the plane 231 and retarded via a transparent planar glass plate 241 which acts only on the illumination field but is transparent for the reference field. The lens elements 214, 215, 216, 217 and the objective 218 are selected, aligned and positioned in such a way to allow the imaging of the back aperture 233 of the objective 218 into the respective conjugated planes 231, 232, the so-called pupil planes.

For those skilled in the art, it is obvious that the filter element 241 can be realized in different ways. In the aforementioned description the illumination beam is retarded in respect to the reference light field. An equivalent solution consists in a retardation of the reference light field in respect to the illumination light field. In this case the area crossed by the illumination field will be optically thinner. This is easily achieved by etching a plat glass plate or by a programmable SLM element.

Figure 2B:
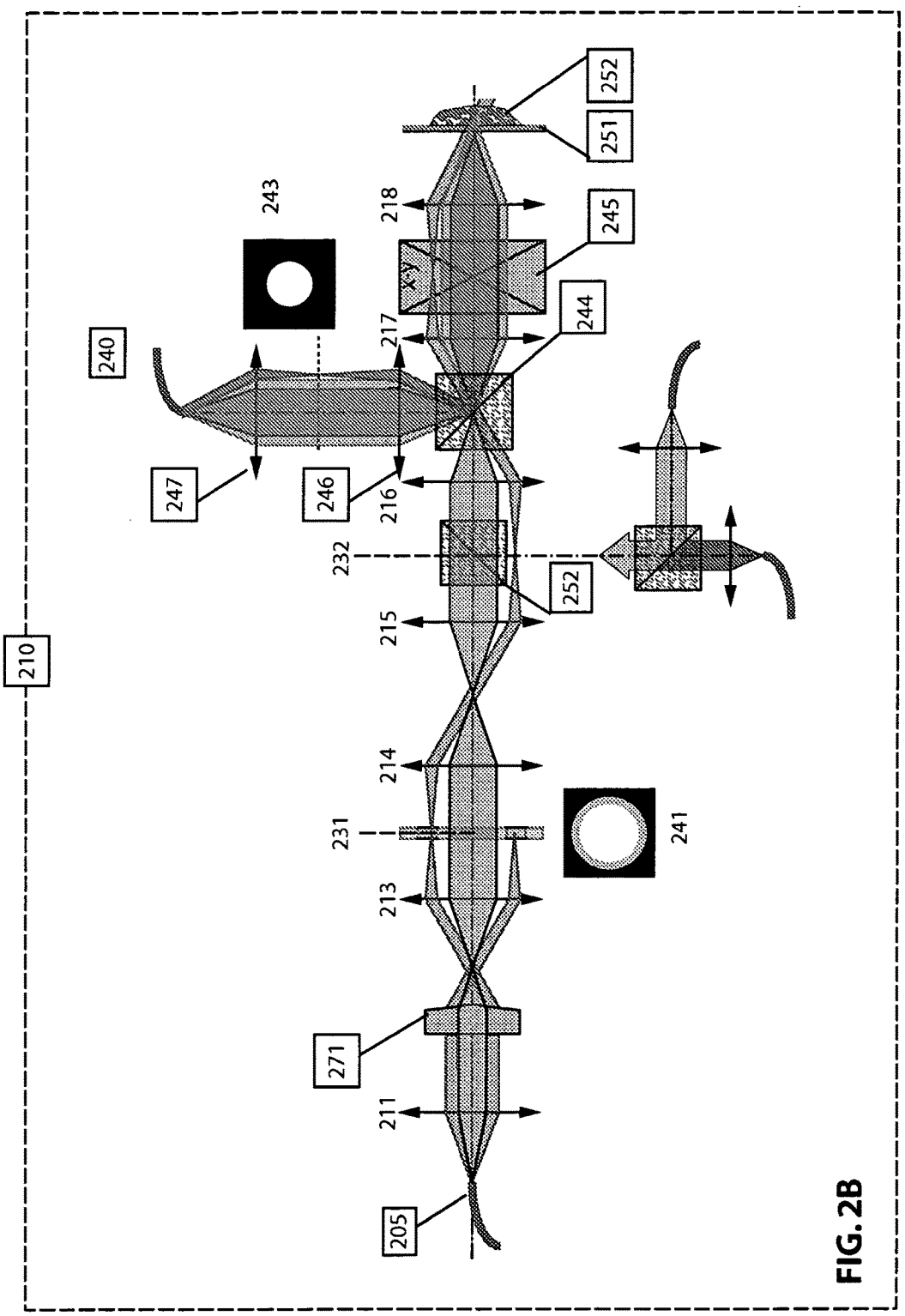
FIG. 2B is a schematic illustration of the forth embodiment of a common path OCM system, showing in addition the detection beam in accordance with the present invention.
Figure 3A:
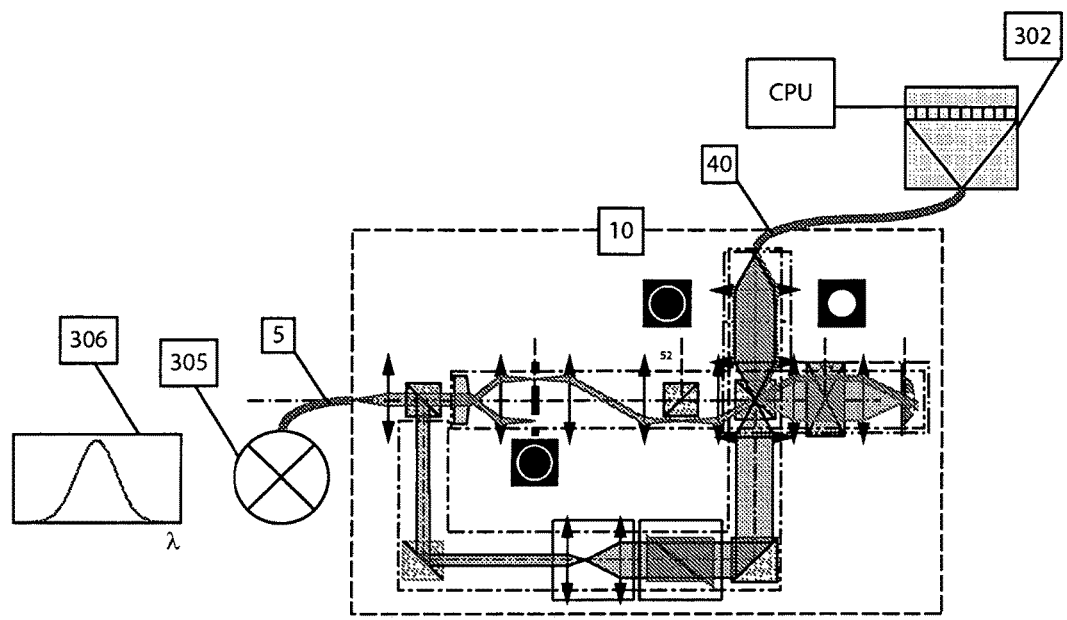
FIG. 3A is a schematic illustration of a OCM system in a Fourier Domain Optical Coherence configuration, in accordance with the present invention.
Figure 3B:
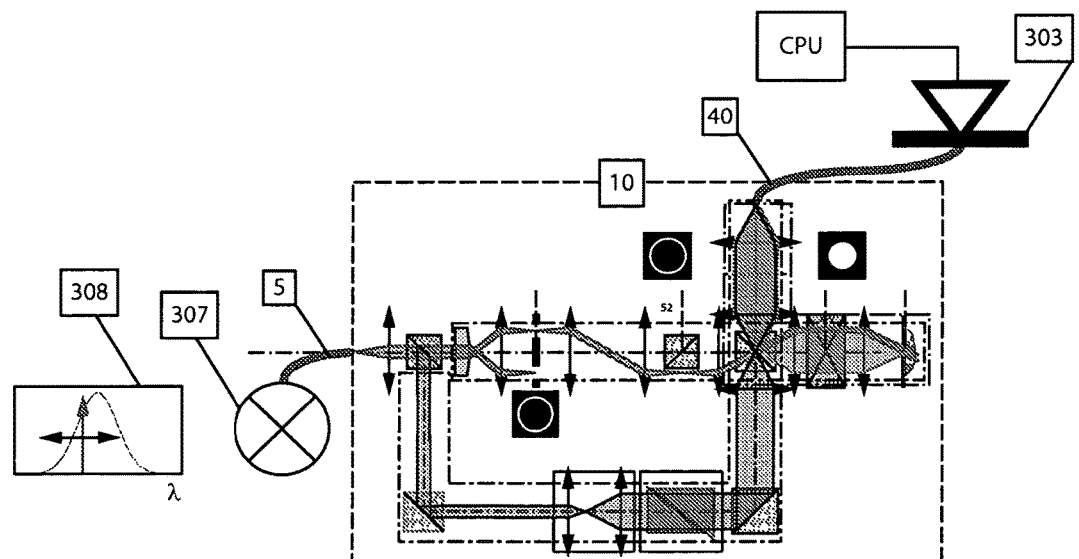
FIG. 3B is a schematic illustration of a OCM system in a Spectral Domain Optical Coherence configuration, in accordance with the present invention.

As indicated in FIG. 2B the filter elements 42 and 43 are mutually exclusive. The filter element 243 selects the inner part of the reference field and the backscattered field from the sample 251, 252. For this filter element choice any back reflection from the illumination field is suppressed. This corresponds to the dark field mode operation i.e. DF-mode operation, where the interference or the coherent interaction between the high spatial frequency contribution of the backscattered light field and the reference field represent the signal.

Figure 6A:
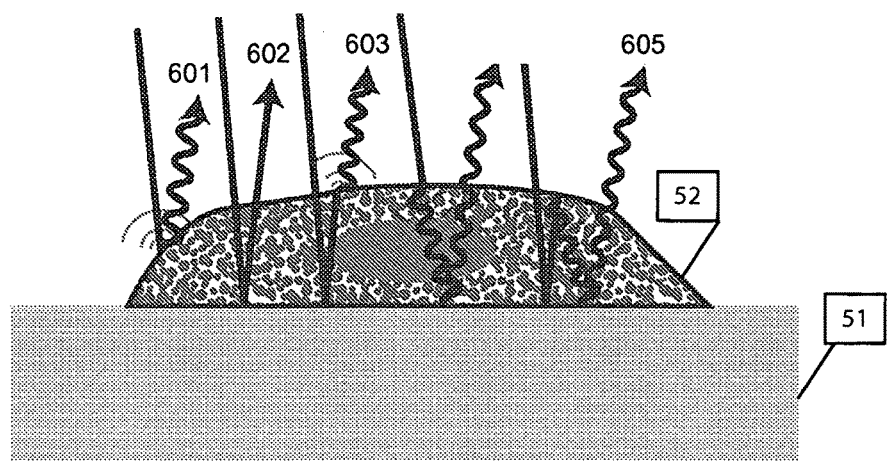
FIG. 6 is a schematic illustration of the different light contributions and corresponding tomogram contributions generated by the disclosed OCM systems in accordance with the present invention.

As indicated in FIG. 6A, different light contributions 601-605 are obtained while observing a sample 52 suspended on a coverslip 51 (up-right position) with the OCM 10. The different light contributions are classified in 5 different categories:

601 incident, back-scattered
602 incident, reflected on frontsurface of coverslip 51
603 incident, reflected on frontsurface of coverslip 51, forward-scattered
604 incident, forward-scattered, reflected on frontsurface of coverslip 51
605 incident, reflected on frontsurface of coverslip 51, back-scattered on sample interface, reflected on frontsurface of coverslip 51.

Figure 6B:
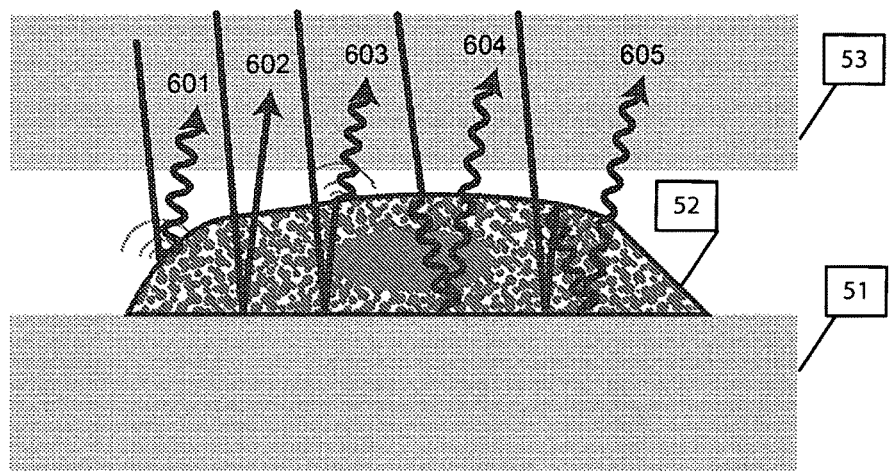
Figure 6C:
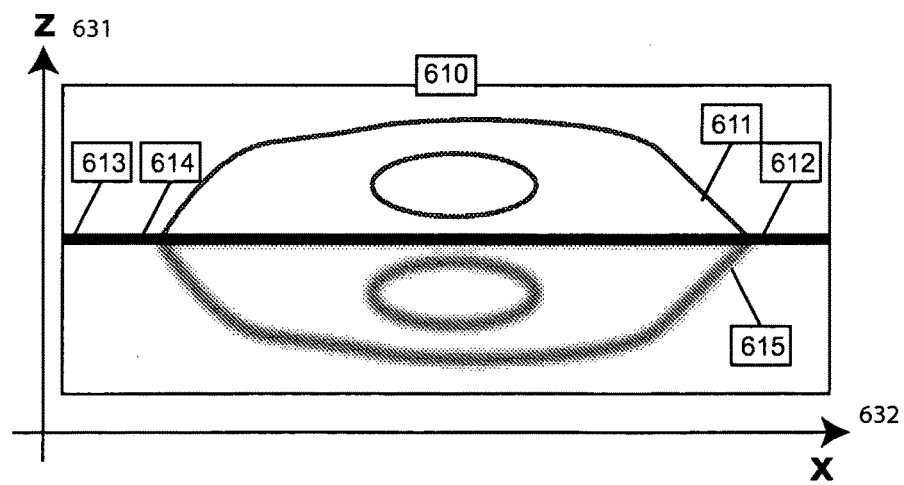

This results in a tomogram 610 shown in FIG. 6B. As an example but not limited too, the tomogram of a cell 611 and its mirror term 615 separated by the coverslide flat surface image 612-614 is shown. The DF-mode enhances the sensitivity to light contributions 601 and 605 and allows in such a way to record only the tomogram 611 and its mirror term 615, while the SR-mode is only sensitive to light contributions 602 of the flat 51. As is well known to those skilled in the art, the optical path length induced by the sample can be extracted from this flat surface image. This results in quantitative phase images. If the up-right position is reversed i.e. as in a classical microscope, only tomograms 611 in DF mode are recorded, however with a better sensitivity.

In the common-path configuration 210, only tomograms 611 in the dark-field mode are recorded. This limitation of the OCM 210 can be overcome by adding a $2^{nd}$ coverslip 53 producing the reference field. In this case a DF-mode tomogram 611 as well as SR-mode tomogram can be recorded simultaneously.

As described aforementioned, different tomogram contributions 611-615 can be recorded. Using advanced signal reconstruction methods, a spatial resolved refractive index distribution as well as a spatial resolved dispersion distribution can be extracted.

For those skilled in the art the aforementioned optical system 10 and 210 are interferometric imaging system belonging to the family of optical coherence microscopes. Both systems allow detecting the back reflected sample light corresponding to the high spatial frequencies of the sample 52. This is a further object of this invention. It is also obvious, that these optical systems 10 and 210 allow a 3-dimensional and phase sensitive imaging of samples in full accordance with known imaging properties of optical coherence microscopy and optical coherence tomography, which represents a further object of this invention.

As indicated in FIG. 2B an additional imaging modality based fluorescence imaging can be added. The add-on optical set-up consists of an excitation port 287, where the fluorescence excitation light enters. This excitation light is collimated by the lens element 283 and redirected by a prism 282 or an equivalent dichroic mirror towards the coupling prism 252. This excitation light beam can excite fluorescent markers in the sample 252 after crossing the optical elements 232, 216, 244, 217, 245, 218. The reemitted fluorescent light is redirected across the reverse light path back to the sub-system 280 entering the dichroic beamsplitter and the lens element 284 onto the detection port 286. For those skilled in the art it is obvious that such a subsystem 280 can be easily generalized for multimodal platform integrating multiphoton microscopy or a multitude of nonlinear optics imaging modalities.

Figure 4A:
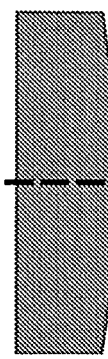
FIG. 4 A-G is a schematic illustration of several axicons in accordance with the present invention.

As indicated in FIG. 4A-G generalized axicon elements are disclosed. FIG. 4A discloses a standard axicon element.

Figure 4B:
Figure 4C:
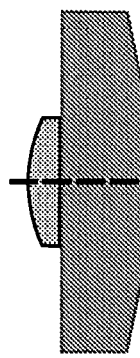
Figure 4D:
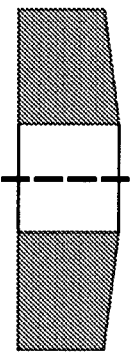
Figure 4E:
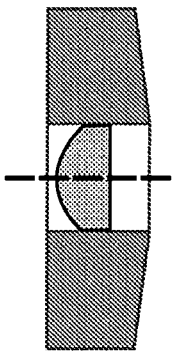
Figure 4F:
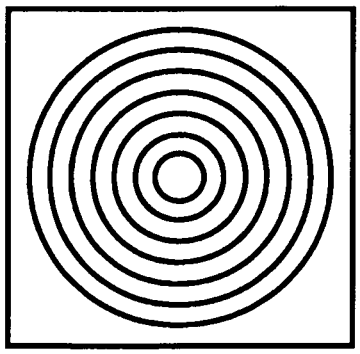
Figure 4G:
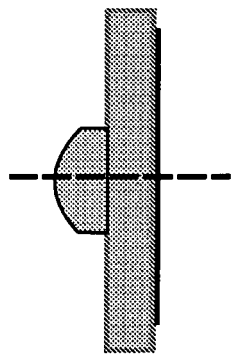

It is understood that all these drawings are mainly cross sectional representation (except FIG. 4F) and that all axicon elements in FIG. 4A-G possess a rotational symmetry around the optical axis. FIG. 4B-C represents one possible solution of a generalized Axicon element for the common path OCM disclosed in FIG. 2A, B. An additional solution for this OCM system, where the inner part (reference beam) needs to focused, whereas the outer part (illumination beam) is deviated in a dome shaped light field is given in FIG. 4D-E, where a standard axicon as indicated in FIG. 4A contains a circular opening (FIG. 4D) which can be filled with any spherical lens element as shown in FIG. 4E. FIG. 4F indicated a diffractive Axicon element with a concentric equally spaced phase grating. This realization can be easily merged with a refractive or a second diffractive element in a hybrid solution as indicated in FIG. 4G. An only refractive element would be an aspherical optical element or a only diffractive element could be a specifically designed element for such an interferometric imaging system.

Figure 1C:
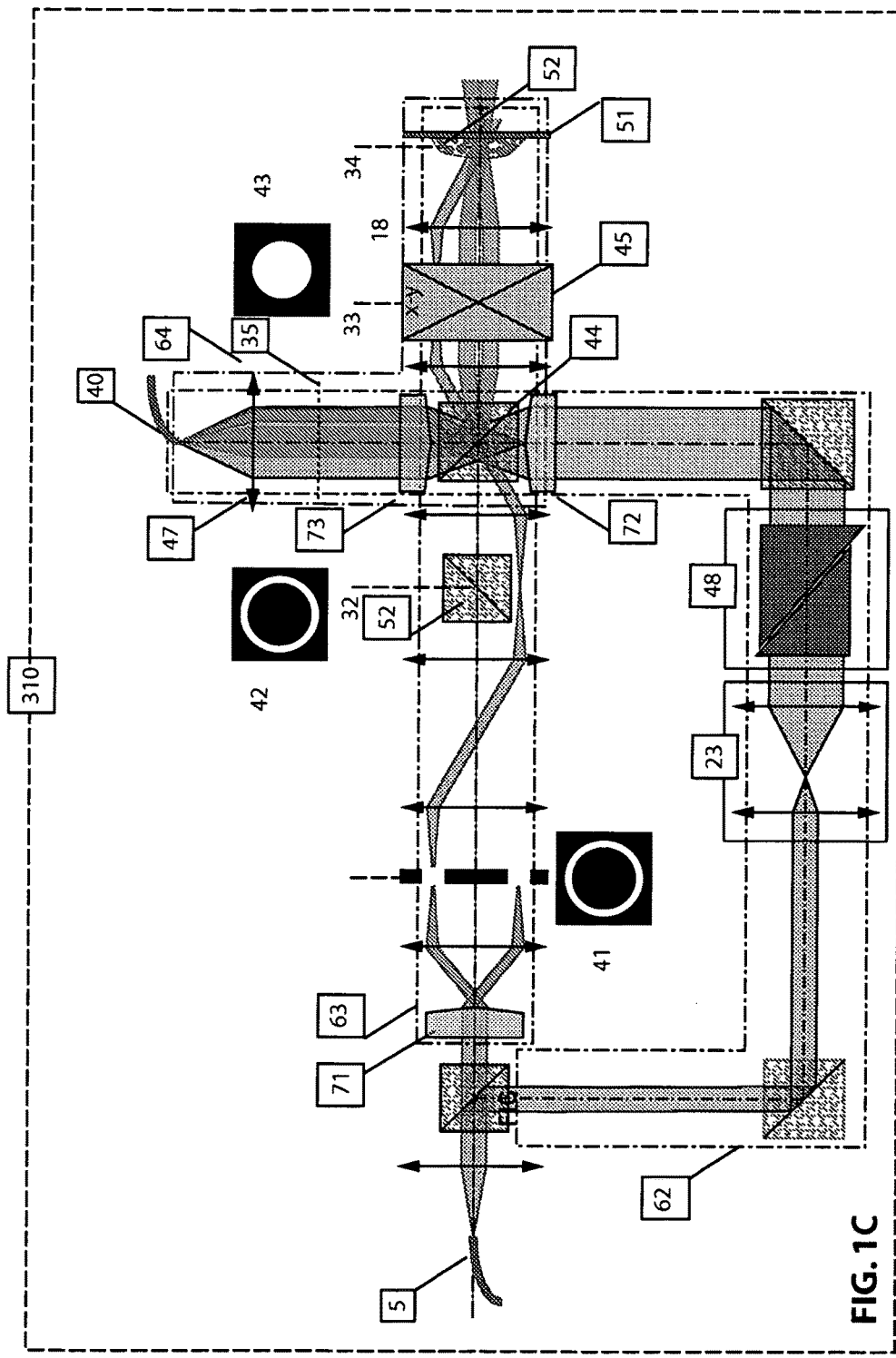
FIG. 1C is a schematic illustration of the second embodiment of a OCM system, showing a Bessel-Bessel OCM system in accordance with the present invention.

As indicated in FIG. 1C different configurations for the OCM system are possible. As indicated in FIG. 1C a so-called Bessel-Bessel configuration 310 is explicitly disclosed. Three basically different configurations are possible:

the classical confocal scheme, with Gaussian illumination and detection optics;

the xfOCM scheme with Bessel-like illumination and Gaussian detection; as indicated in FIG. 1A the combination of Bessel-like illumination due to the axicon element 71 and Bessel-like detection due to the combination of axicon elements 72 and 73 as indicated in the OCM illustration in FIG. 1C.

In this configuration, the Bessel-like fields in the objective's back-aperture or in the conjugated pupil planes 33, 35 have distinct ring diameters due to adapted axicon cone angles in elements 71, 72, 73 and the lens elements 12-18. In combination with the corresponding ring masks, this allows to achieve an improved suppression of the specular reflection.

Compared to the classical confocal Gaussian illumination and detection, the Bessel-like schemes b) and c) provide the aforementioned advantage of the extended depth of field.

Figure 1D:
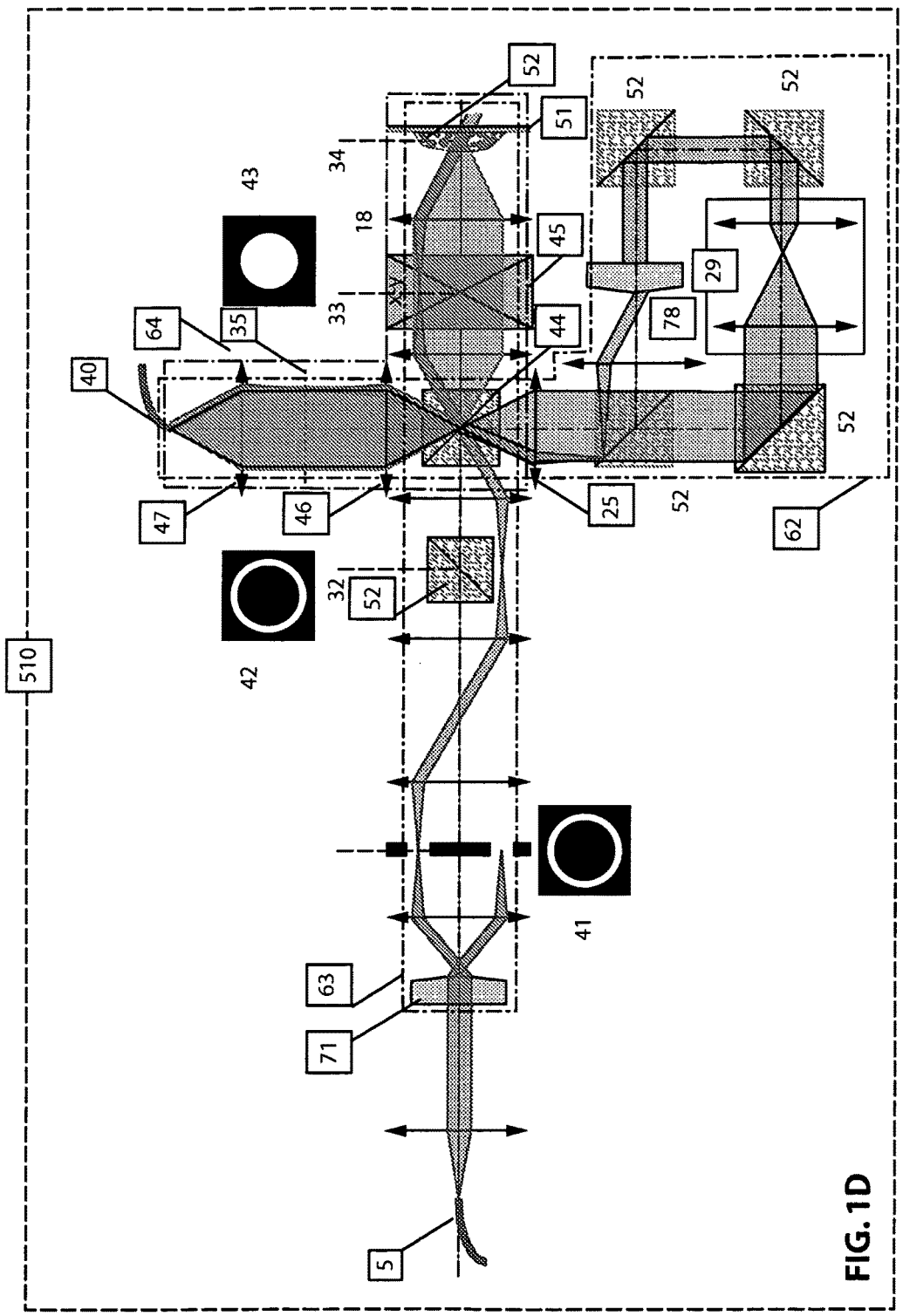
FIG. 1D is a schematic illustration of the third embodiment of a OCM system, showing a Michelson type OCM system in accordance with the present invention.

As indicated in FIG. 1D a Michelson Type OCM system is described. The element 78 combines a lens and axicon element in order to convert the illumination beam (reflected at the prism element 44) back into a Gaussian beam. This Gaussian reference beam is redirected by prism or mirror element towards the detection port 40. The telescope system 29 allows a variable adjustment of the beamwidth in order to steer the beam overlap between the detection beam and the reference beam. This allows a DF-mode as well as a SR-mode operation.

Figure 5:
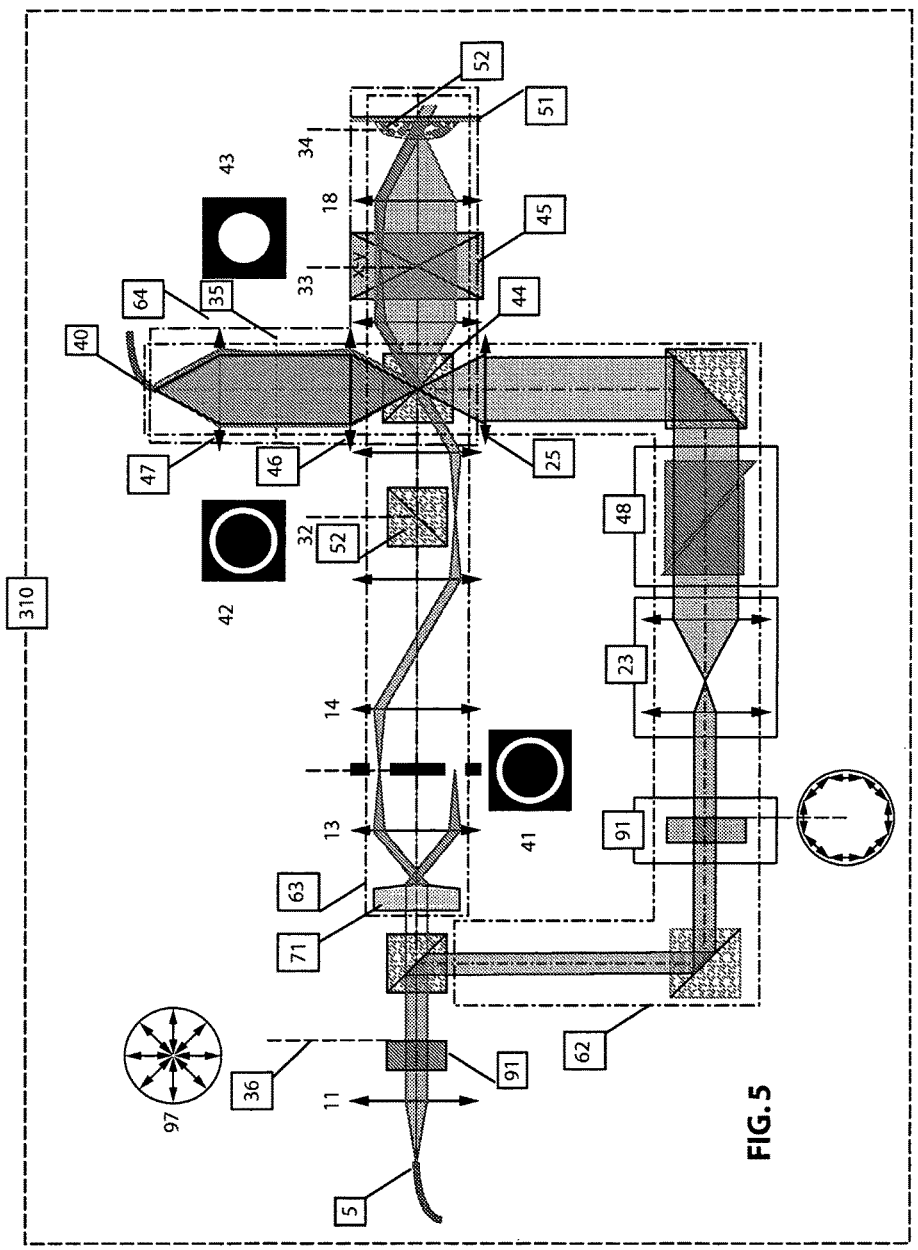
FIG. 5 is a schematic illustration of a polarization enhanced contrast OCM in accordance with the present invention.

Referring to FIG. 5 a further polarization sensitive OCM 310 is disclosed. After a collimation by lens element 11 a radial polarizing element 91 is added. As indicated schematically in 97 a radial polarized light field results at the exit of this radial polarizing element. In consequence the sample 52 is illuminated by a radially polarized light field. The reference field propagating along the reference arm undergoes a polarization rotation by polarization rotator 91. If the polarization rotation is exactly 90 degree no interference is possible i.e. no OCM signal is detected. This represents a kind of polarization darkfield effect. However if there are scatters like nanoparticles metallic of dielectric which rotate the polarization of the backscattered field a highly sensitivity for these kind of scatterers results. A further extension of this imaging modality consists in a heterodyne detection when the polarization rotation in element 91 is modulated with a carrier frequency. A phase sensitive signal results for an ultimate imaging of small scatterers contained in sample 51.

As indicated in FIGS. 1 and 2 a small sampling volume with a high rejection of background radiation can be achieved. These disclosed optical systems 10, 210, 510 integrating an objective 18 with a high numerical aperture are suitable for single particle tracking, with metallic, semiconducting or dielectric nanoparticles in a size range well below 100 nm. These particles can be detected on a single particle level, tracked in all 3 spatial dimensions with a high time resolution and used as suitable nanolabels with high optical contrast for dark field detection or OCM. A particular interest is single particle detection based on correlation analysis comparable to fluorescence correlation spectroscopy (FCS) but not limited hereto, for the monitoring of bare or functionalized nanoparticles, where the functionalization is based on biomolecules with a high affinity for targeted cell structures or cell processes. It is well known by those skilled in the art that the correlation analysis of this particle detection has to integrate the coherent signal amplification and coherent nature of the optical signal and the spectral detection and responses as plasmonic interactions of these particles. The optical systems can be further miniaturized for an optical sensing device with a sensitivity of single particles and a high molecular specificity known for biomolecules as antibodies, apatameres, peptides etc. and overcoming difficulties as photobleaching and lifetime limitation of fluorescent markers.

Figure 7:
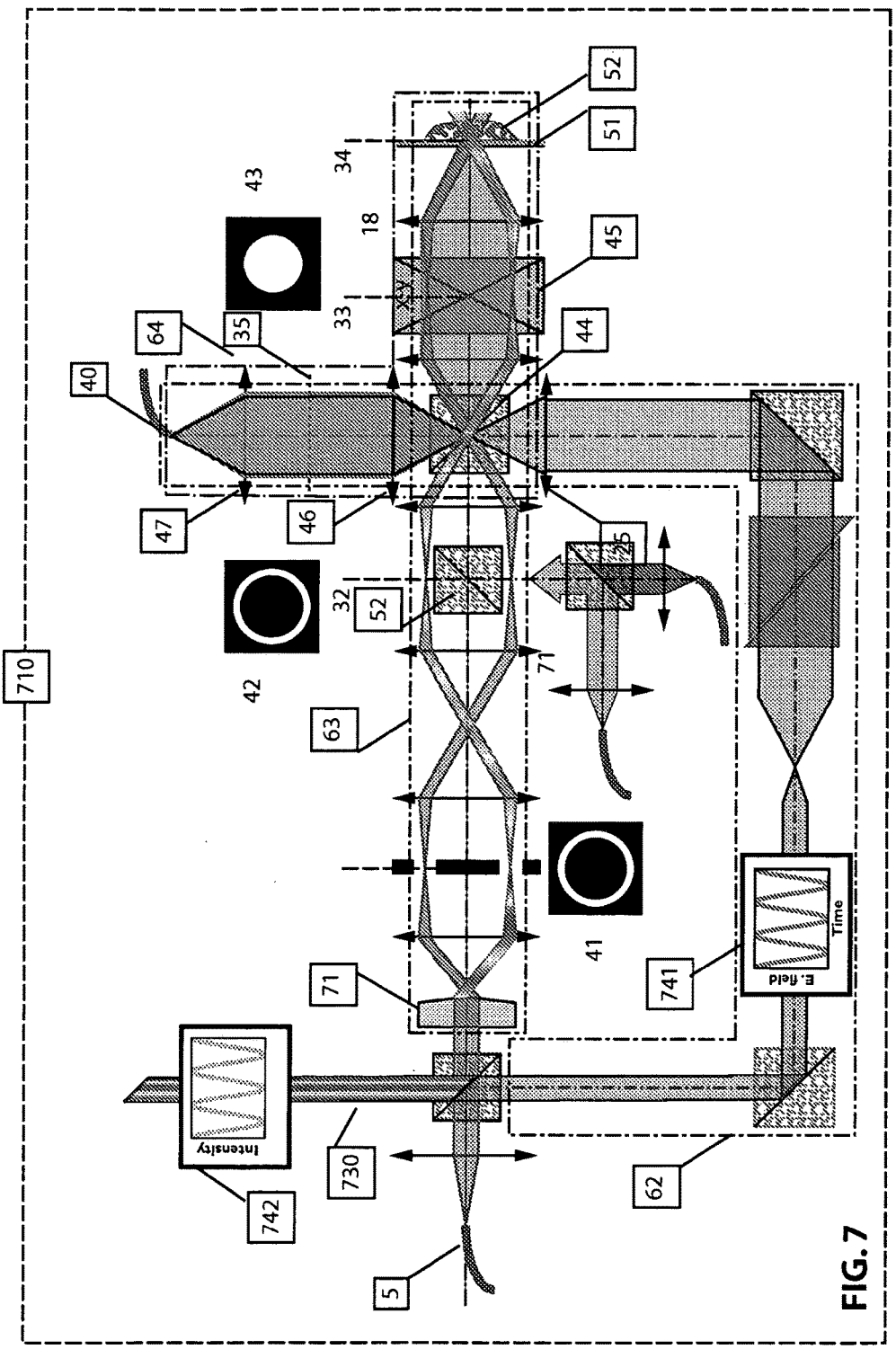
FIG. 7 is a schematic illustration of a OCM system integrating a heating beam and modulation means in the reference path for a photothermal contrast enhancement.

Referring to FIG. 7 a further OCM system 710 integrating modulation means 741, 742 for the heating beam 730 and in the reference arm 62 are disclosed. In consequence the sample 52 is exposed to the heating beam 730. The sample 52 labeled with functionalized nanoparticles interacts with this heating beam 730. The absorbing nanoparticles cause a strong scattering response modulated at the modulation frequency of the heating beam. Here, the illumination field propagating along the illumination arm (63) acts as a probe beam for these timely modulated vicinities containing an absorbing nanoparticle. This back-scattered field containing a DC-component and a timely modulated field component is directed to the detector and mixes with the reference field as known from the classical OCM or OCT principle. If the reference is modulated at the same frequency as the heating beam a strong demodulated signal results, strongly amplified by the phase locked or phase synchronized or a synchronization between the modulation frequency of the heat beam and the modulation frequency of the reference field. Sample structures which are not absorbing or are only weakly absorbing will be suppressed, when the integration time of the detector spans over several modulation periods. For those skilled in the art, this is known as averaging of a timely modulated signal, which is used in this disclosed configuration for a specific contrast enhancement of the nanoparticles based on the photothermal effect. It is known for those skilled in the art, that a photothermal contrast enhancement can be used for an imaging of a single nanoparticle with improved localization accuracy. This bears the potential for superresolution microscopy, especially when the scattering response shows a blinking behaviour.

The aforementioned embodiments and advantage are exemplary and not shown as a limit of the present invention. The present teaching may be extended to other instrumentations. The detailed description of the present invention is intended to be illustrative, and in no case to limit the scope of this invention. Many alternatives, alterations, modification and variations will be apparent to hose skilled in the art.

The invention claimed is:

1. A dark field optical coherence microscopy system comprising:
   a light source,
   sample holding means for holding a sample,
   an illumination arm having a first optical axis for illumination light,
   a reference arm, the reference arm sharing the first optical axis with the illumination arm for the reference light,
   a detection arm,
   an objective located along the first optical axis of the illumination arm and the reference arm,
   an axicon located in the illumination arm and the reference arm, configured to produce a dome shaped illumination light field from the illumination light and configured to focus the reference light in a center of the axicon,
   a filter arranged in the illumination arm and the reference arm, the filter being transparent to the reference light and retarding the illumination light, or being transparent to the illumination light and retarding the reference light, and
   a filter positioned on the detection arm, the filter having a circular opening configured to suppress specular reflection of the illumination light from the sample holding means.

2. The optical coherence microscopy system according to claim 1, wherein the filter positioned on the detection arm includes a programmable spatial light modulator element.

3. The optical coherence microscopy system according to claim 1 further comprising:
   a prism for redirecting both the reference light and the illumination light towards a detection port.

4. The optical coherence microscopy system according to claim 1, further comprising:
   a device for generating a modulated heating beam modulated by a modulator, synchronized modulation means integrated in the reference arm for an additional photothermal contrast enhancement.

5. The optical coherence microscopy system according to claim 1, further comprising:
   an excitation port for entering fluorescence excitation light for excite fluorescence markers in the sample, and
   a lens element for collimating the fluorescent excitation light.

* * * * *